United States Patent
Kaibel et al.

(10) Patent No.: US 7,264,696 B2
(45) Date of Patent: Sep. 4, 2007

(54) DIVIDING-WALL COLUMN WITH FEED IN WHOLE OR IN PART IN THE VAPOROUS STATE AND/OR SIDE STREAM TAKE OFF IN WHOLE OR IN PART IN THE VAPOROUS STATE

(75) Inventors: Gerd Kaibel, Lampertheim (DE); Christian Miller, Ruppertsberg (DE); Katrin Klaβ, Mannheim (DE); Alois Kindler, Grünstadt (DE); Werner Aquila, Mannheim (DE); Walter Dobler, Schwetzingen (DE); Klaus Breuer, Altrip (DE); Achim Pommer, Weisenheim (DE); Thomas Dirnsteiner, Mainz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/384,370

(22) Filed: Mar. 21, 2006

(65) Prior Publication Data

US 2006/0157336 A1 Jul. 20, 2006

Related U.S. Application Data

(62) Division of application No. 10/319,715, filed on Dec. 16, 2002, now Pat. No. 7,090,748.

(30) Foreign Application Priority Data

Dec. 21, 2001 (DE) .............................. 101 63 335

(51) Int. Cl.
B01D 3/42 (2006.01)
(52) U.S. Cl. ................. 203/1; 203/99; 203/DIG. 19; 203/100

(58) Field of Classification Search ................. 203/1, 203/2, 99, 100, DIG. 19; 202/158
See application file for complete search history.

(56) References Cited

U.S. PATENT DOCUMENTS

| 2,254,182 | A | * | 8/1941 | Kraft .............................. 203/2 |
| 4,230,533 | A | | 10/1980 | Giroux | |

(Continued)

FOREIGN PATENT DOCUMENTS

| CA | 1 222 717 | 6/1987 |
| CA | 1 242 309 | 9/1988 |

(Continued)

*Primary Examiner*—Virginia Manoharan
(74) *Attorney, Agent, or Firm*—Novak Druce & Quigg, LLP (57) ABSTRACT

A dividing-wall column having a dividing wall which is essentially disposed along the long direction of the column is proposed, which divides the column interior into a feed part, a take off part, an upper shared column part and a lower shared column part, with feed in whole or in part in the vaporous state of a mixture to be separated between the upper region of the feed part and the lower region of the feed part and/or side stream take off in whole or in part in the vaporous state between the upper region of the take off part and the lower region of the take off part, where if feed is in whole or in part in the vaporous state the cross-sectional area of the upper region of the feed part is increased by plane-parallel displacement of the dividing wall toward the upper region of the take off part, and/or if the side stream take off is in whole or in part in the vaporous state, the cross-sectional area of the lower region of the take off part is increased by displacement of the dividing wall toward the lower region of the feed part, in such a manner that the F factor is substantially the same in all column regions.

1 Claim, 6 Drawing Sheets

U.S. PATENT DOCUMENTS

| | | | |
|---|---|---|---|
| 4,247,368 A * | 1/1981 | Bannon et al. | 202/158 |
| 4,560,442 A * | 12/1985 | Jain | 203/2 |
| 4,994,152 A * | 2/1991 | Kaibel et al. | 203/75 |
| 6,254,735 B1 | 7/2001 | Watzenberger | |
| 6,551,465 B1 | 4/2003 | Van Zile et al. | |
| 6,645,350 B1 | 11/2003 | Steacy | |
| 6,846,389 B2 | 1/2005 | Kaibel et al. | |
| 7,001,490 B2 * | 2/2006 | Wostbrock et al. | 203/1 |

FOREIGN PATENT DOCUMENTS

| | | |
|---|---|---|
| DE | 100 08 634 | 8/2001 |
| EP | 0 122 367 | 10/1984 |
| EP | 0 126 288 | 11/1984 |
| EP | 0 133 510 | 2/1985 |
| EP | 1 127 601 | 2/2001 |
| EP | 1 084 741 | 3/2001 |

* cited by examiner

Prior Art

FIG.6

Prior Art

DIVIDING-WALL COLUMN WITH FEED IN WHOLE OR IN PART IN THE VAPOROUS STATE AND/OR SIDE STREAM TAKE OFF IN WHOLE OR IN PART IN THE VAPOROUS STATE

This is a Divisional application of application Ser. No. 10/319,715 filed on Dec. 16, 2002, which issued as U.S. Pat. No. 7,090,748 on Aug. 15, 2006, the entire disclosure of which is hereby incorporated by reference.

For the continuous fractionation by distillation of multicomponent mixtures, various process variants are customary. In the simplest case, the feed mixture is divided into two fractions, a low-boiling overhead fraction and a high-boiling bottom-phase fraction. When feed mixtures are divided into more than two fractions, according to this process variant, a plurality of distillation columns must be used. In order to limit the equipment required, in the separation of multicomponent mixtures, where possible, columns having liquid or vaporous side stream take offs are used. However, the potential use of distillation columns having side stream take offs is greatly limited by the fact that products taken off at the side stream take off points are never completely pure. In the case of side steam take offs in the enrichment part, which are usually made in liquid form, the side stream product still has contents of low-boiling components which are to be separated off overhead. Correspondingly, for side stream take offs in the stripping part, which are generally performed in the vaporous state, the side stream product still has high-boiler contents. The use of conventional side stream take off columns is therefore restricted to cases where contaminated side stream products are permissible.

An alternative to this is what are termed dividing-wall columns, that is to say columns which prevent cross-mixing of liquid streams and vapor streams in subzones of the column by means of a vertical dividing wall, generally a flat metal sheet, which is disposed in the long direction of the column. This makes it possible to draw off pure side streams in dividing-wall columns.

The dividing wall which is disposed in the long direction of the column divides the column interior into a feed part, a take off part, an upper shared column part and a lower shared column part. The mixture to be separated is generally fed into a central region of the feed part, between an upper and lower region of the feed part. In the take off part, a side stream take off is disposed between an upper and lower region of the same. It is also possible to provide a further side stream take off between the lower region and the lowest region of the take off part.

A dividing-wall column is, in principle, a simplification in terms of apparatus of thermally coupled distillation columns, but the latter have higher capital costs. Dividing-wall columns and thermally coupled columns, compared with the arrangement of conventional distillation columns, offer advantages both with respect to energy consumption and also capital costs and are therefore preferentially used in industry. Dividing-wall columns can be constructed both as packed columns containing dumped or arranged packings or as tray columns. If packed columns are used, ordered fabric packings having a specific surface area of from 300 to 800 $m^2/m^3$, preferably from 500 to 750 $m^2/m^3$, are particularly suitable. Usually, dividing-wall columns are constructed in such a manner that the dividing wall runs vertically and the cross-sectional areas of the take off part and the feed part are the same size. Further information on dividing-wall columns is given, for example, in EP-A 0 122 367, EP-B 0 126 288 and EP-B 0 133 510.

Dividing-wall columns have to date generally been equipped with a centrally arranged dividing wall, thus having equal cross-sectional areas in the feed part and take off part. EP-A 1 084 741 describes a dividing-wall column in which the cross section of the feed part differs from the cross section of the take off part. However, the cross section of the feed part, and also that of the take off part, is in each case constant over the entire height of the same.

DE-A 100 08 634 describes a further dividing-wall column having a dividing wall disposed off-center, with the upper region of the feed part having a reduced cross section compared with the lower region of the feed part, and the upper region of the take off part having an increased cross section compared with the lower region of the take off part. By means of this particular design, it was possible, at low operating pressures in the range from 0.5 to 20 mbar, to ensure a more cost-effective operation with improved separation efficiency.

In particular process configurations with feed in whole or in part in the vaporous state and/or side stream take off in whole or in part in the vaporous state, the amount of vapor in the feed part and/or in the take off part of a dividing-wall column is not constant over the entire column height.

It is an object of the present invention to provide a dividing-wall column which is optimally loaded under these conditions and hence operates more economically compared with known dividing-wall columns.

We have found that this object is achieved by a dividing-wall column having a dividing wall which is essentially disposed along the long direction of the column, which divides the column interior into a feed part, a take off part, an upper shared column part and a lower shared column part, with feed in whole or in part in the vaporous state of a mixture to be separated between the upper region of the feed part and the lower region of the feed part and/or side stream take off in whole or in part in the vaporous state between the upper region of the take off part and the lower region of the take off part.

The solution of the object features the fact that if the feed is in whole or in part in the vaporous state, the cross-sectional area of the upper region of the feed part is increased by displacement of the dividing wall toward the upper region of the take off part and/or if side stream take off is in whole or in part in the vaporous state, the cross-sectional area of the lower region of the take off part is increased by plane-parallel displacement of the dividing wall toward the lower region of the feed part, in such a manner that that the F factor is substantially the same in all column regions.

An index for the loading of the column or of the separating internals in the column is what is termed the F factor. The F factor is defined as the product of the gas velocity $w_G$ of dimensions m/s, multiplied by the square root of gas density $\rho_G$ of dimensions $kg/m^3$. For given column internals, there is in each case a maximum F factor which, for reasons of economic efficiency is achieved as far as possible, but must not be exceeded. In accordance with the above definition, the F factor is proportional to the gas velocity which is in turn proportional to the ratio between the mass flow rate of the gas and the cross-sectional area through which flow passes.

The F factor is thus proportional to the ratio of the mass flow rate of the gas and the cross-sectional area through which gas flows.

For economical column operation, therefore, attempts are made to ensure that all column regions are operated with the respective maximum F factor. Therefore, provided that the separating internals are identical in all of the column regions, the F factor should be at least substantially identical in all column regions.

The inventors have found that, to ensure a substantially equal F factor in all column regions in accordance with the above descriptions, the ratio of the mass flow rate of the gaseous phase and the cross section through which flow passes must remain the same.

This is achieved according to the invention by the dividing wall being disposed off-center, more precisely in such a manner that with feed in whole or in part in the vaporous state the cross-sectional area of the upper region of the feed part is increased by displacing the dividing wall toward the upper region of the take off part. If, in addition, or alternatively, a side stream is taken off in whole or in part in the vaporous state, according to the invention in addition or alternatively the cross-sectional area of the lower region of the take off part is also increased by arranging the dividing wall off-center, more precisely by displacing the same toward the lower region of the feed part.

Depending on the specific separation task, it can be advantageous to dispose, below the first vaporous side stream take off a second side stream take off in whole or in part in the vaporous state between the lower region of the take off part and the lowest region of the take off part, in which the cross-sectional area of the lowest region of the take off part is increased by displacing the dividing wall (DW) toward the lower feed part in such a manner that the F factor is substantially the same in all regions of the dividing-wall column.

The ratio of the cross-sectional areas of the upper region of the take off part to the upper region of the feed part (2) is from 1:1.6 to 1:2.4, preferably 1:2.0 and/or the ratio of the cross-sectional areas of the lower region of the take off part (5) to the lower region of the feed part (4) is from 1.6:1 to 2.4:1, preferably 2.0:1.

The dividing wall is generally a flat metal sheet which is welded, detachably attached or mounted loose on the column interior wall between feed and take off part.

The dividing wall is preferably displaced by an offset piece, that is to say by a partial piece of the dividing wall which deviates from the vertical, and is inclined to the horizontal at an angle of from 30 to 70°, preferably at an angle of 60°. In this arrangement, turbulence of the gas stream which can impair the separation efficiency is substantially avoided.

In a preferred embodiment, the height of the upper region of the feed part matches the height of the upper region of the take off part, and/or the height of the lower region of the feed part matches the height of the lower region of the take off part. If unequal heights of the separating internals cannot be avoided, in individual column regions, partial pieces are not provided with separating internals. However, by choosing separating internals of different separation efficiencies, in practice, open spaces may generally be avoided.

To take off and divide the liquids at the upper end of the dividing wall and at the side stream take off point(s), both internal collection chambers for the liquid and collection chambers which are disposed externally to the column are suitable, which assume the function of a pump feed or ensure a sufficiently high static head of liquid. Control elements, for example valves, enable controlled further transport of liquid. In the case of plate columns it is particularly expedient for this to increase the outlet shaft to about 2 to 3 times the conventional height and to store the corresponding amount of liquid in it. When packed columns are used, the liquid is first held in collectors and from there passed into an internal or external collection chamber. In the case of plate columns and higher pressures, the liquid can also advantageously be backed up in a chimney tray.

The invention also relates to a process for separating by distillation mixtures of substances in a dividing-wall column, where to compensate for interference in the feed rate and/or the feed concentration, the division of the liquid at the upper end of the dividing wall (DW) and at the side stream take off point or points is controlled in such a manner that the flow rates of the liquids which at the upper region of the feed part and/or the lower region of the take off part or the lowest region of the take off part do not fall below 30% of their usual value.

The invention will now be described in more detail with reference to a drawing and examples.

In detail, in the drawings:

FIG. 5 shows a diagrammatic representation of a dividing-wall column of the prior art having a side stream take off and.

In the figures, the same reference numbers denote the same or corresponding features.

Figure 1:
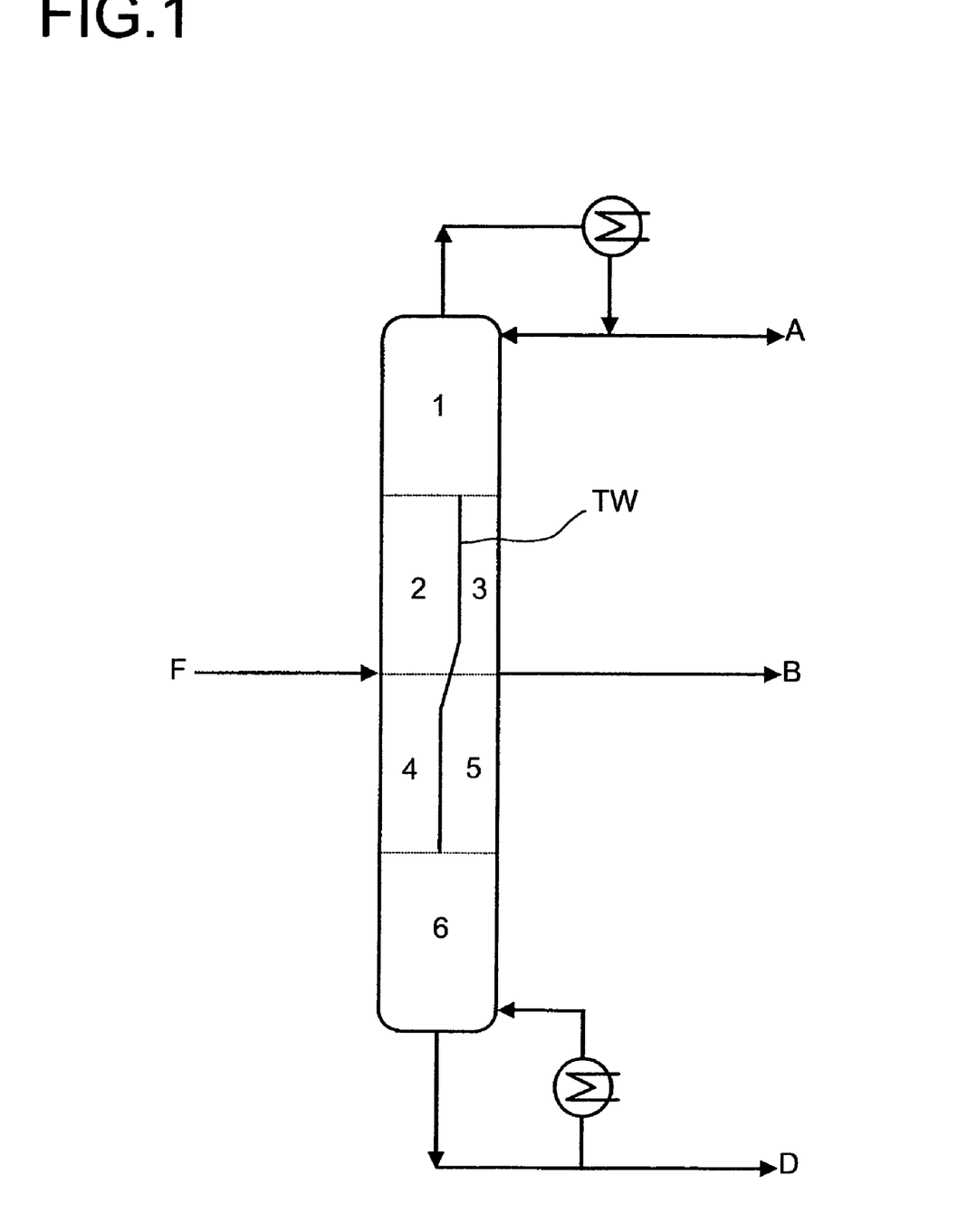
FIG. 1 shows a diagrammatic representation of a first embodiment of an inventive dividing-wall column having increased cross-sectional area of the upper region of the feed part.

The dividing-wall column shown in FIG. 1 has a dividing wall DW disposed off-center in subzones, which dividing wall divides the dividing-wall column into a feed part 2, 4, a take off part 3, 5, an upper shared column region 1 and a lower shared column region 6. The feed F is applied between the upper region of the feed part 2 and the lower region of the feed part 4, and the side stream take off B is taken off between the upper region of the take off part 3 and the lower region of the take off part 5. In addition, an overhead stream A and a bottom stream D are taken off from the column. The dividing wall DW is arranged off-center in the upper region of the same, in such a manner that the cross section of the upper region of the feed part 2 is increased at the expense of the cross section of the upper region of the take off part 3.

Figure 2:
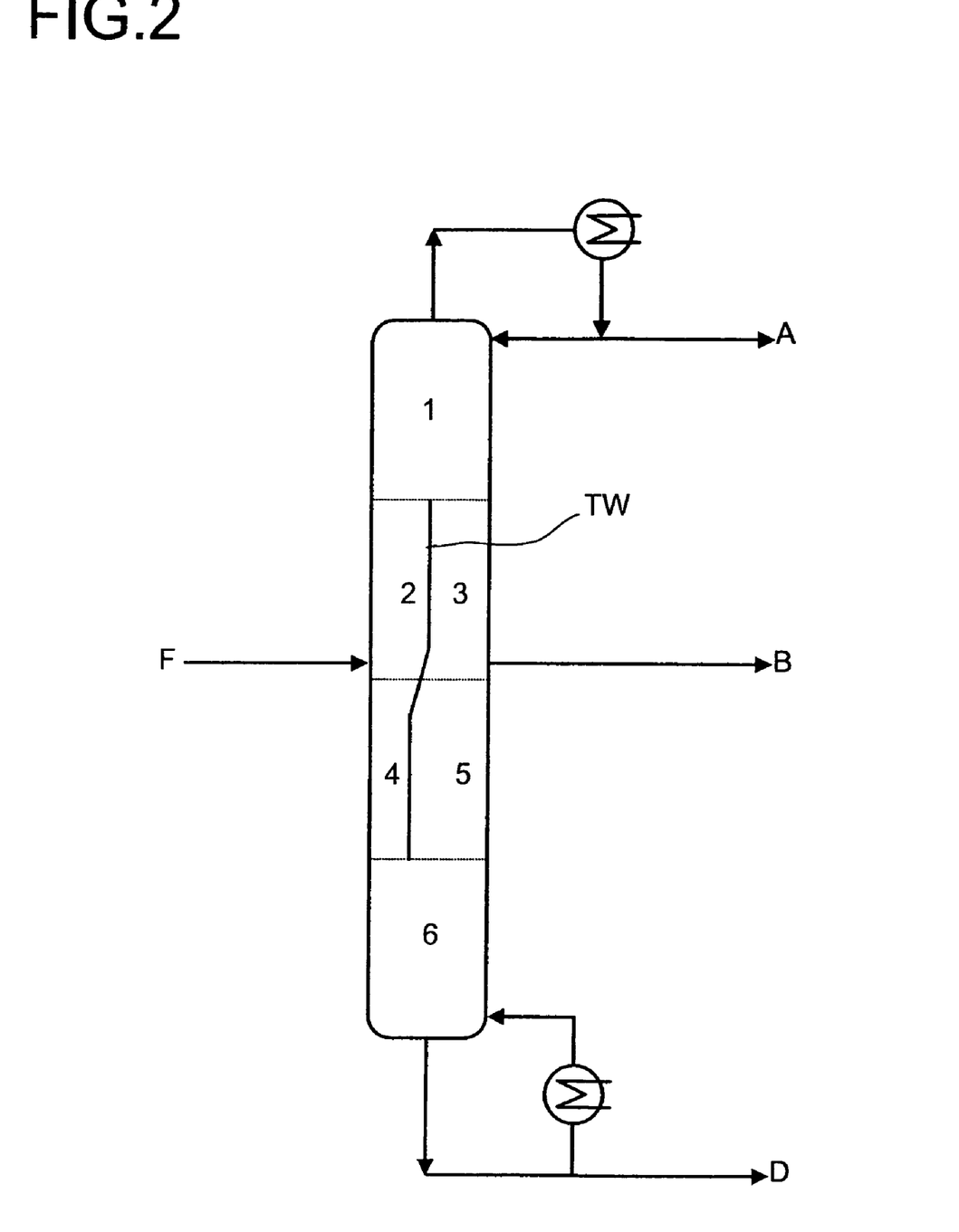
FIG. 2 shows a diagrammatic representation of a further embodiment of an inventive dividing-wall column having increased cross-sectional area of the lower region of the take off part.

The embodiment shown in FIG. 2 differs from the embodiment in FIG. 1 by the dividing wall DW being arranged centrally in the upper region of the same, but being arranged off-center in the lower region of the same, in such a manner that the lower region of the take off part 5 is increased compared with the lower region of the feed part 4.

Figure 3:
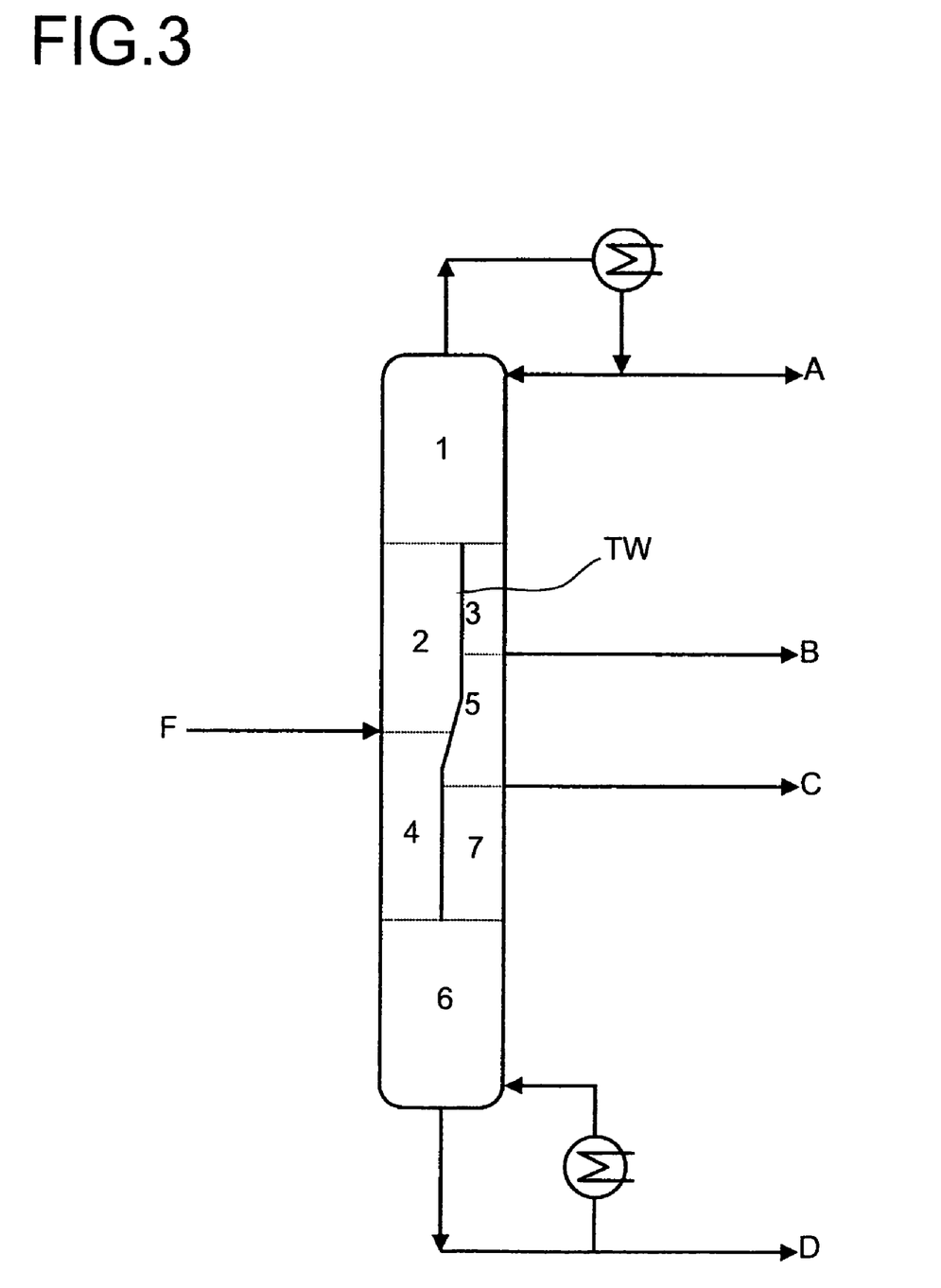
FIG. 3 shows a diagrammatic representation of a further embodiment of an inventive dividing-wall column with two side stream take offs in whole or in part in the vaporous state having increased cross-sectional area of the upper region of the feed part.

The embodiment shown diagrammatically in FIG. 3 shows a dividing-wall column having two wholly or partially vaporous side stream take offs B and C. By disposing the dividing wall DW off-center in partial regions of the same, the upper region of the feed part 2 is increased at the expense of the upper region of the take off part 3 and the lower region of the take off part 5.

Figure 4:
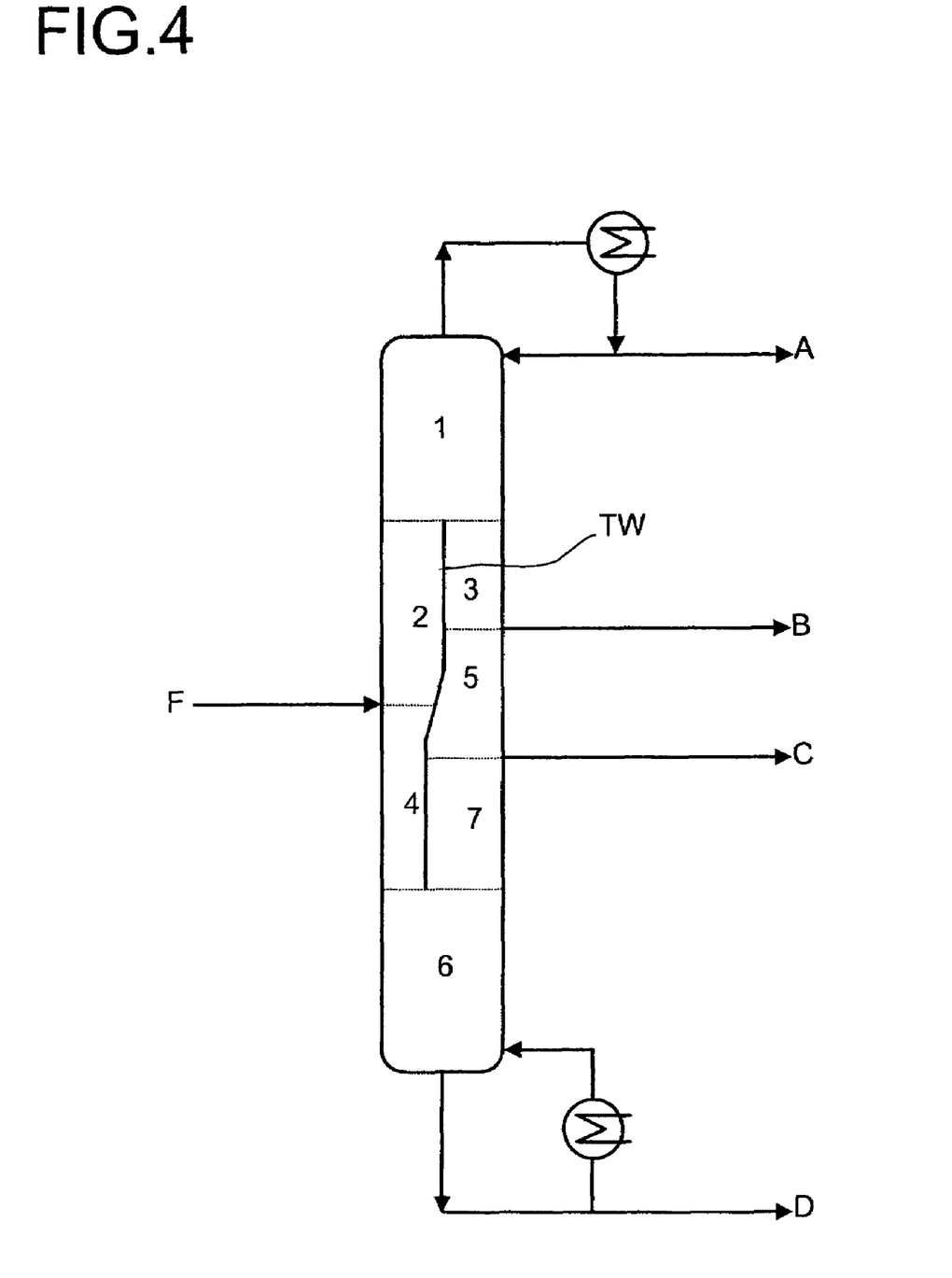
FIG. 4 shows a diagrammatic representation of an embodiment of an inventive dividing-wall column having two side stream take offs in whole or in part in the vaporous state having increased cross-sectional areas of the lower and lowest regions of the take off part.

FIG. 4 shows a further embodiment of an inventive dividing-wall column having two wholly or partially vaporous side stream take offs B and C, the dividing wall DW being disposed off-center in partial regions of the same, in such a manner that the lower region of the take off part 5 and the lowest region of the take off part 7 are increased at the expense of the lower region of the feed part 4.

Figure 5:
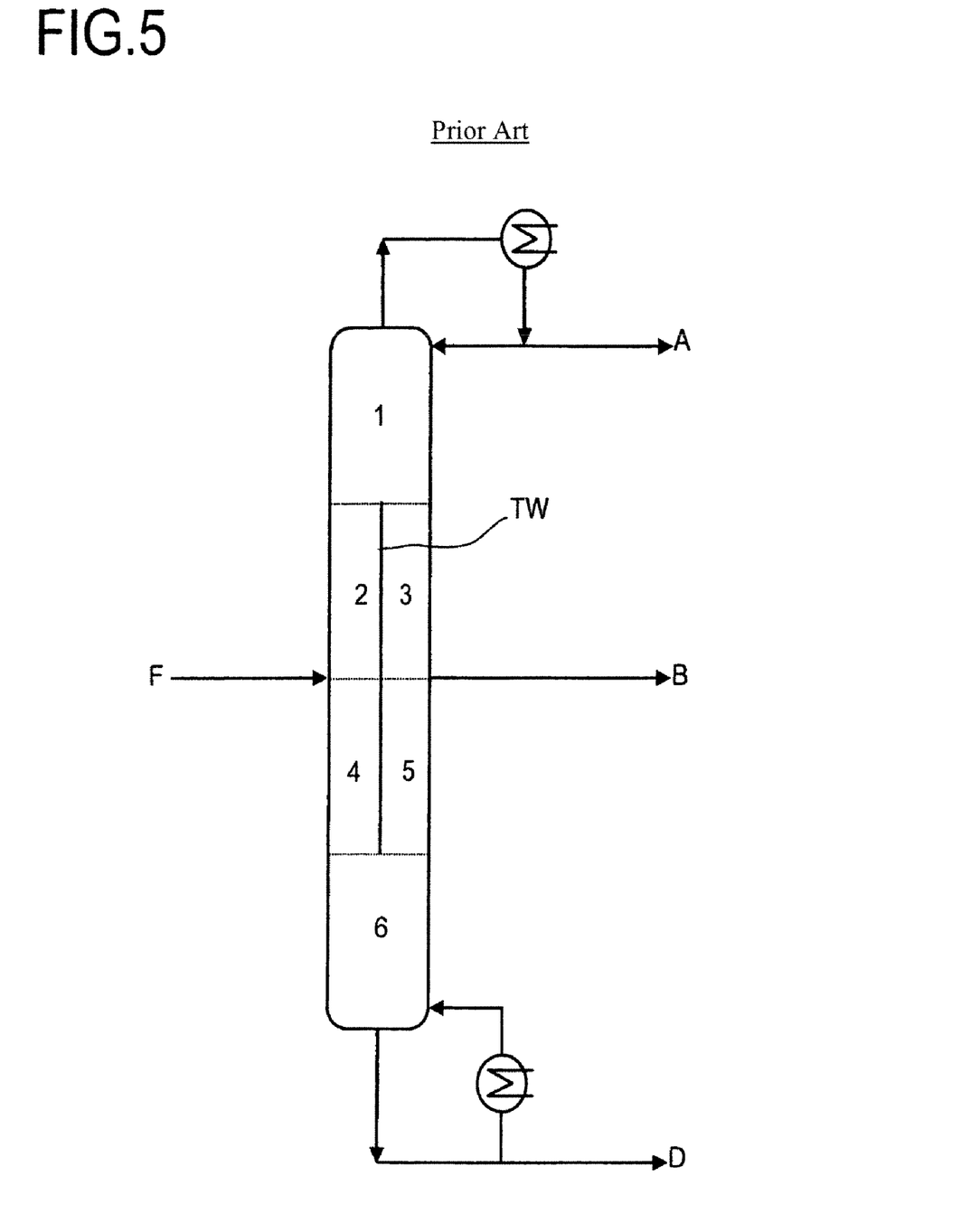

In contrast, FIG. 5 shows a diagrammatic representation of a dividing-wall column of the prior art having a centrally arranged dividing wall DW and correspondingly having column subzones 2, 3, 4 and 5 each having the same cross section. The dividing-wall column has a single side stream take off B between the upper region of the take off part 3 and the lower region of the take off part 5.

Figure 6:
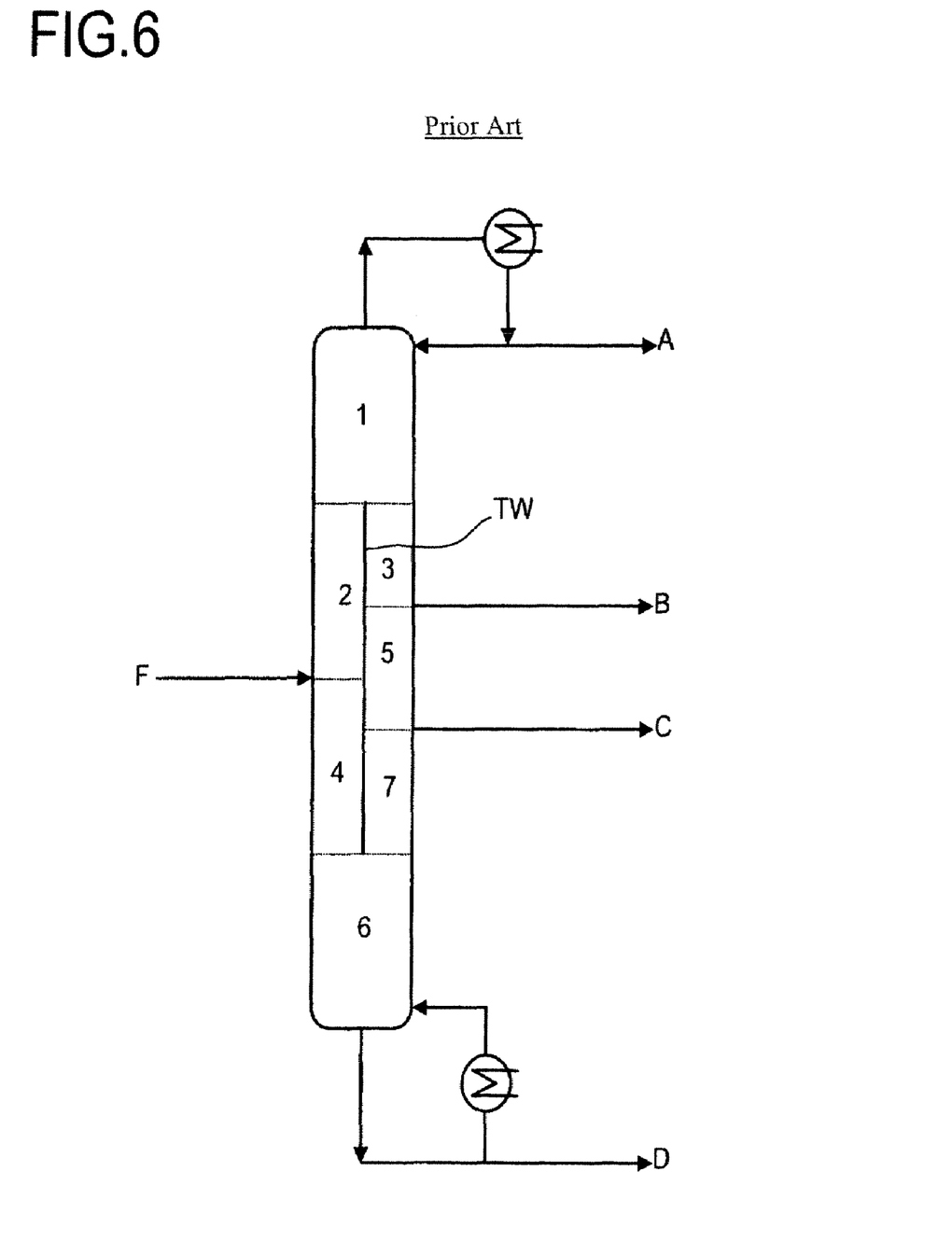
FIG. 6 shows a diagrammatic representation of a dividing-wall column of the prior art having two side stream take offs.

In contrast, FIG. 6 shows a further embodiment of a dividing-wall column of the prior art having two side stream take offs B and C, with stream B being taken off between the upper region of the take off part 3 and the lower region of the take off part 5 and stream C being taken off between the lower region of the take off part 5 and the lowest region of the take off part 7. This dividing-wall column is also, similarly to the embodiment shown in FIG. 5, equipped with a centrally arranged dividing wall DW and thus with constant cross sections in the column subzones 2, 3, 4, 5, 7.

EXAMPLES

The examples were carried out on an experimental column having a diameter of 0.08 m, which, over a height of in total 5 m, was fitted with a wire mesh packing type BX from Sulzer AG, Winterthur, of a specific surface area of 500 $m^2/m^3$ and had a theoretical number of plates of 35. A dividing wall was welded into the column between the 6th and 21st separation stage, counting the separation stages from the bottom. The feed and the take off point were disposed at the same column height. The liquid was divided at the upper region of the feed part 2 and the upper region of the take off part 3 in a ratio of 1:2. The cross sectional ratio of the upper region of the feed part 2 and of the upper region of the take off part 3 of the dividing-wall column was 2:1, and the cross sectional ratio of the lower region of the feed part 4 and of the lower region of the take off part 5 of the dividing-wall column was 1:1. The column thus corresponded to the diagrammatic representation in FIG. 1. The offset piece between the upper and lower subparts of the dividing wall had an angle of 60° to the horizontal. The dividing-wall column was operated at a top pressure of 10 mbar.

Example 1

Purification of a C15-Alcohol by Distillation

A feed was fed into the above-described experimental column in the gaseous state at a flow rate of 977 g/h at a temperature of 153° C. The feed mixture contained 77% by mass C15-alcohol, 19% by mass lower-boiling minor components and 4% higher-boiling minor components, in each case based on the boiling point of C15-alcohol. At a reflux ratio of 8, at the column top 180 g/h of lower-boiling minor components having a residual content of 1% by mass C15-alcohol were taken off. The bottom product containing the higher-boiling minor components was taken off at a flow rate of 67 g/h with a content of 47% by mass C15-alcohol.

The product of value C15-alcohol was taken off in the liquid state from the side stream take off at a flow rate of 730 g/h and a purity of greater than 98%.

Comparative Example 1

With an experimental arrangement which was otherwise the same, but with a central arrangement of the dividing wall column the throughput through the experimental column was 25% less.

Example 2

Purification of a C10-Alcohol by Distillation

A stream of 931 g/h was fed into the same experimental column in the gaseous state at a temperature of 158° C. The feed mixture contained 75% by mass C10-alcohol, 19% by mass lower-boiling minor components and 6% higher-boiling minor components, in each case based on the boiling point of C10-alcohol. At a reflux ratio of 8, at the column top 172 g/h of lower-boiling minor components having a residual content of 1% by mass C10-alcohol were taken off. The bottom product containing the higher-boiling minor components was taken off at a flow rate of 99 g/h with a content of 46% by mass C10-alcohol. The product of value was taken off in the liquid state at the side stream take off at a flow rate of 660 g/h and a purity of >98%. The liquid was divided at the upper region of the feed part 2 and the upper region of the take off part 3 of the experimental column in a ratio of 1:2.

Comparative Experiment 2

The experiment was repeated under otherwise equal conditions, but with a central arrangement of the dividing wall. The throughput was 25% lower compared with the example of the invention.

Example 3

Purification of a C20-Alcohol by Distillation

A stream of 766 g/h was fed into the same experimental column in gaseous state at a temperature of 188° C. The feed mixture contained 73% by mass C20-alcohol, 23% by mass lower-boiling minor components and 4% higher-boiling minor components. At a reflux ratio of 15, at the column top 172 g/h of lower-boiling minor components having a residual content of 1% by mass C20-alcohol were taken off. The bottom product containing the higher-boiling minor components was taken off at a flow rate 53 g/h with a content of 53% by mass C20-alcohol. The product of value was taken off in the liquid state at the side stream take off at a flow rate of 540 g/h and a purity of >98%. The liquid was divided at the upper region of the feed part and the upper region of the take off part in a ratio of 1:2. The column was, in a departure from the experiments in examples 1 and 2, operated at a top pressure of 2 mbar.

Comparative Experiment 3

The experiment was repeated under otherwise identical conditions, but with a central arrangement of the dividing wall. The throughput was 25% less than the throughput described in example 3 according to the inventive process.

We claim:

1. A process for separating by distillation mixtures of substances, which comprises conducting the separation in a dividing-wall column having a dividing wall which is essentially disposed along the long direction of the column, which divides the column interior into a feed part, a take off part, an upper shared column part and a lower shared column part, with feed in whole or in part in the vaporous state of a mixture to be separated between an upper region of the feed part and a lower region of the feed part and/or side stream take off in whole or in part in the vaporous state between an upper region of the take off part and a lower region of the take off part, in which, when the feed is in whole or in part in the vaporous state the cross-sectional area of the upper region of the feed part is increased by plane-parallel displacement of the dividing wall toward the upper region of the take off part and/or when the side stream take off is in whole or in part in the vaporous state, the cross-sectional area of the lower region of the take off part is increased by displacement of the dividing wall toward the lower region of the feed part, in such a manner that the F factor is substantially the same in all column regions and which comprises, to compensate for interference in the feed rate and/or the feed concentration, controlling a division of liquid at the upper end of the dividing wall and at the side stream take off point or points in such a manner that the flow rates of the liquids at the upper region of the feed part and/or the lower region of the take off part or the lowest region of the take off part do not fall below 30% of their usual value.

* * * * *